UNITED STATES PATENT OFFICE.

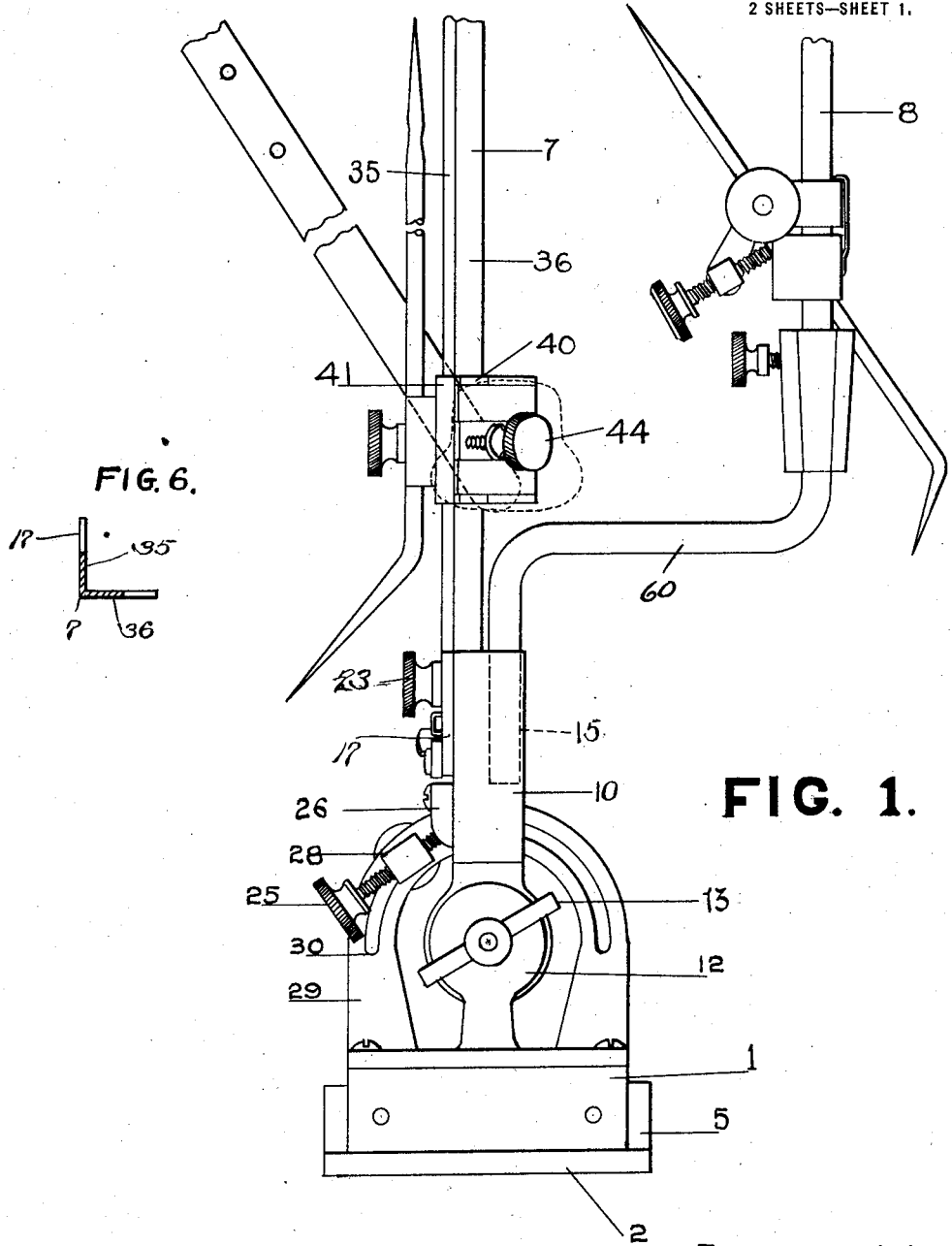

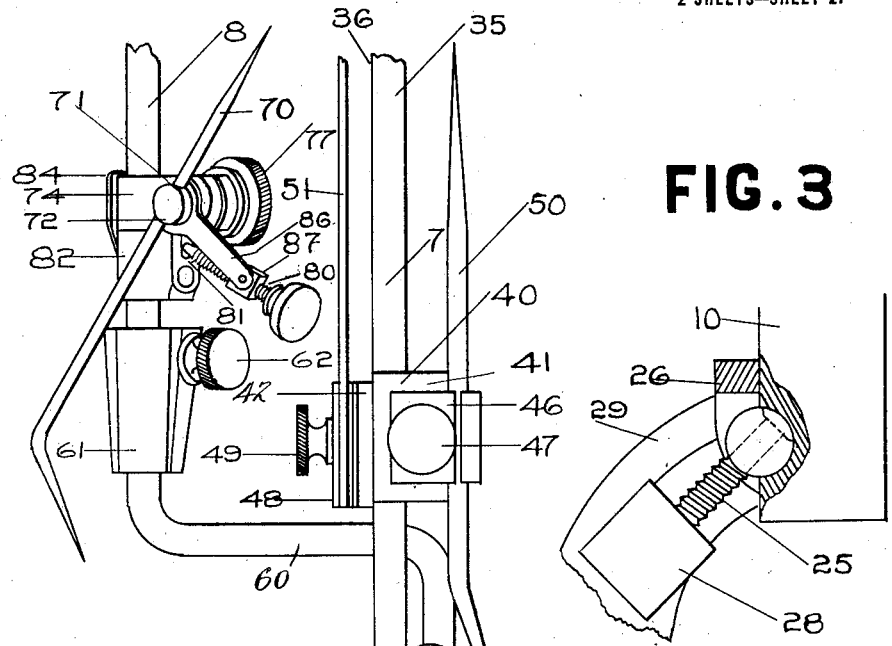
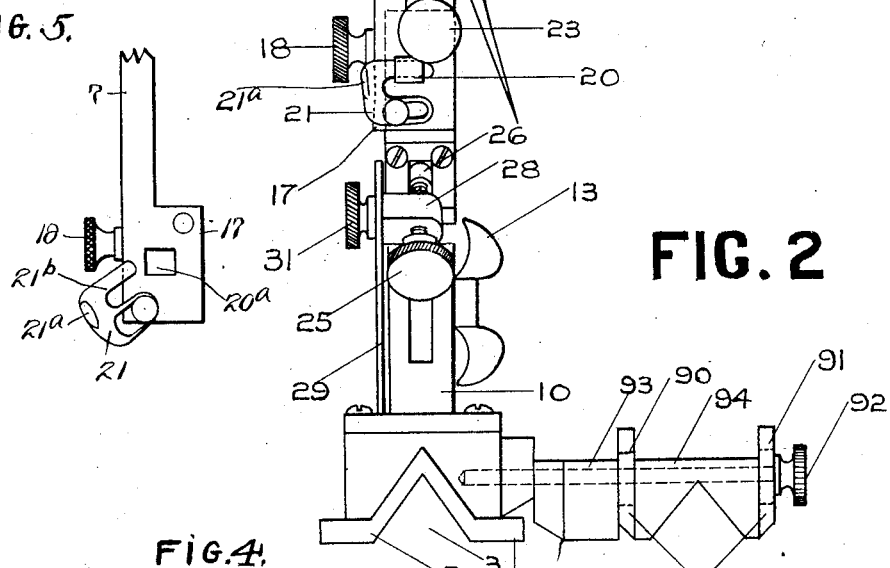
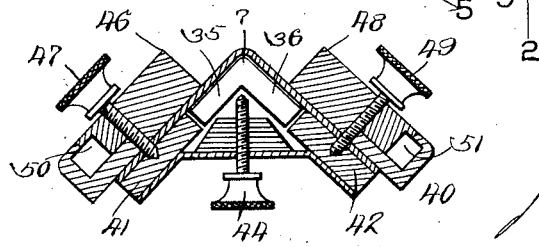

EDWARD WULZ, OF NEW YORK, N. Y.

COMBINATION-GAGE.

1,391,233.　　　　　　Specification of Letters Patent.　　Patented Sept. 20, 1921.

Application filed January 22, 1920. Serial No. 353,377.

*To all whom it may concern:*

Be it known that I, EDWARD WULZ, a citizen of the United States, and resident of New York city, in the county of New York and State of New York, have invented certain new and useful Improvements in Combination-Gages, of which the following is a specification.

This invention relates to machinists' marking gages, and aims to provide improvements therein.

The present invention provides a marking gage having one or more uprights on which a plurality of marking instruments, gaging instruments or the like, may be mounted and set, so that where a machinist has a number of markings or measurements to make, he may set the several marking or measuring devices for the several markings or measurements before beginning his work, and not have to change the setting of his marking or measuring device each time he has to make a new mark or measurement. Moreover the instrument may be set for making several marks or measurements, as above explained, and can be used for marking a number of articles or pieces of work, all of the markers retaining the same setting for the several pieces of work, thereby insuring a more uniform marking or measuring.

The invention further provides an instrument in which the inclination of the upright, or uprights, may be varied, and further provides an instrument with a stub to which different forms of uprights may be attached, and to which a plurality of uprights may be attached.

The invention further provides an instrument with guiding means or attachments, adapted to coöperate with ribs straight-edges, or the like, and preferably readily adapted to be moved into and out of operative or active position, so that one or more of these guiding means of attachments may be successively used in making different markings.

The invention further provides novel parts, and combinations, hereinafter more fully described, and pointed out in the annexed claims.

An embodiment of the invention is illustrated in the accompanying drawings; wherein—

Figure 1 is a view in elevation of the instrument;

Fig. 2 is also a view in elevation, the view being at right angles to that in Fig. 1.

Fig. 3 is a detail view of a feed screw and its connection to the upright.

Fig. 4 is a horizontal section of a block for attaching the measuring instruments to one of the uprights.

Fig. 5 is an elevation of the lower part of one of the uprights.

Fig. 6 is a partly sectional view of the same upright.

Referring to said drawings, numeral 1 designates a base, having a level or plane bottom 2, adapted to set or slide on the plane surface of a laying out table, or the like, and the bottom of the base is also preferably provided with a V-shaped groove 3 adapted to slide on a gib or rib on a lathe or the like. The groove 3 is preferably formed in a separate piece 5, which is detachable from the base and which may be substituted by other pieces similar to the piece 5, provided with grooves of a different shape.

The base 1 may be provided with one or more uprights. Two uprights 7, 8, are here shown. These uprights 7, 8, are preferably connected to the base 1, through the intermediary of a stub 10, and this stub 10, is preferably pivotally mounted on the base, as indicated at 12, and a clamping nut 13 is preferably provided for binding the parts of the joint against movement, so that the stub may be set and fastened in any desired inclined position. The uprights 7, 8, are preferably detachably connected to the stub, and suitable means for this purpose are provided on the stub. As here shown these may comprise a socket 15, for one type of upright, and a corner 17 formed on the lower part of the upright, together with a clamping-screw 18, lug 20 and latch 21, for another type of upright. The lug 20 is formed on the stub 10 and passes through a hole 20ª formed in the corner 17. The latch 21 is rotatably mounted on the corner 17, a projection 21ª on the latch facilitating its handling. The lug 20 of stub 10 protrudes through the hole 20ª in the corner 17 and by pushing the part 21ᵇ of link 21 through an appropriate hole in the lug 20, the stub 10 and corner 17, carrying the upright 7 are firmly connected. A clamping screw 23 may be provided in connection with the socket 15.

For fine setting, the stub 10 may be provided with a feed screw 25. The feed screw 25 may have a ball and socket connection with the stub, as indicated at 26, Fig. 3, and may turn in a nut 28, adjustable on a support 29, provided with a circular slot 30. A clamp-screw 31 serves to bind the nut to the support 29.

One of the uprights, as the upright 7, may be provided with one or more faces 35, 36, which have a definite angular relation to one another, and also preferably to one or more sides of the stub 10. The upright is conveniently in the form of an angle-bar, and the inner side of the angle-bar may fit against a corner of the upright 10, as explained above, and be fastened thereto by suitable means, as by the screw 18 and latch 21. A block 40, having faces 41 and 42 parallel to the faces 35, 36, Figs. 1, 2 and 4, may be slidably mounted on the upright 7. A clamp screw 44 may serve to clamp the block 40 in position on the upright 7. Plates and screws 46, 47, 48, 49 serve to clamp scribers, measuring devices, or the like 50, 51, to the faces 41, 42, of the block 40. The points of the scribers are hence at a known angle to one another, preferably a right angle, and by placing a straight edge along one side or another of the base 1, the scribers may be made to scratch lines at a right, or other known, angle to one another. The sides 35, 36 of the upright 7, are preferably made parallel to one or more sides of the base 1.

The upright 8 may be an ordinary round rod. When used with another upright, it is preferably offset somewhat from the other upright. For this purpose, an off-set arm 60, having one end fitting in the socket 15, and a coupling-piece in the form of a socket 61, may be provided. The upright 8 may be fastened in the socket 61 by means of a clamp-screw 62. A scriber 70 may be mounted on the upright 8. The scriber 70 may be mounted in a hole 71 in a bolt 72 passing through the split ends of a collar 74, the said bolt and consequently the scriber being adapted to be clamped in different positions on the upright 8 by means of a nut 77 on the bolt 72.

Means may be provided for adjusting the height of the point of the scriber 70. These means may comprise a feed-screw 80 having a ball and socket connection 81 with a block 82, adjustable on the upright 8 with the collar 74, to which it may be connected by a hooked finger 84. A link 86 connects a nut 87 on the feed screw with the bolt 72 carrying the scriber 70 and in order that this may be effected, the link and that portion of the bolt engaging the link are of squared formation. When the feed-screw 80 is turned, it moves the nut 87 up or down, causing the link 86 to turn the bolt 72, thereby raising and lowering the point of the scriber 70.

In order to guide the base 1 against the edge or side of a laying-out table or block, the base 1 may be provided with one or more guides or gage-pieces 90, 91. These guides 90, 91 may be fastened to the base 1 by means of clamp-screws 92, and may be separated from the base piece, and from one another, by suitable filler or spacing blocks or pieces 93, 94. One of these pieces 94 may have the character of a grooved block, and this groove may coöperate with a rib, or with a gib on a machine. The pieces 90 91 are preferably provided with slotted openings 96, through which the screws 92 pass, and these slots permit of one guide 90 (or both or all guides) being moved up above the bottom of the base 1, so that all parts may be flush with the bottom of the base, so that one guide piece may be used without interference by another. Thus several scratches may be made at different definite distances from the guiding edge, by simply lowering below the bottom of the base 1, one or another of the guide pieces 90, 91, one being raised before the next is lowered.

While I have specifically illustrated one embodiment of the invention, the invention is not to be understood to be limited thereto, as the invention may receive other embodiments without departing from the idea of invention.

What is claimed is:—

1. A machinist's marking gage comprising a base, a stub pivotally mounted thereon, means for securing the stub in any desired position with relation to the base, an upright removably connected to the stub, a second upright removably connected to the stub and offset from the first-mentioned upright, a block slidable on the first upright, means for clamping scribers or measuring instruments to the block, and means for securing scribers or measuring instruments to the second upright in the desired position and for adjusting them with relation thereto.

2. A machinist's marking gage comprising a base formed in two parts one of said parts being detachable from the other and having a groove therein, a stub pivotally mounted thereon, means for securing the stub in any desired position with relation to the base, an upright removably connected to the stub, a second upright removably connected to the stub and offset from the first-mentioned upright, a block slidable on the first upright, means for clamping scribers or measuring instruments to the block, and means for securing scribers or measuring instruments to the second upright in the desired position and for adjusting them with relation thereto.

3. A machinist's marking gage comprising a base, a stub pivotally mounted thereon, means for securing the stub with relation to the base, means for the fine adjustment of the stub with relation to the base, an upright removably connected to the stub, a second upright removably connected to the stub and offset from the first-mentioned upright, a block slidable on the first upright, means for clamping scribers or measuring instruments to the block, and means for securing scribers or measuring instruments to the second upright in the desired position and for adjusting them with relation thereto.

4. A machinist's marking gage comprising a base, a stub pivotally mounted thereon, means for securing the stub in any desired position with relation to the base, an upright removably connected to the stub, a second upright removably connected to the stub and offset from the first-mentioned upright, a block slidable on the first upright, means for clamping scribers or measuring instruments to the block; and means for securing scribers or measuring instruments to the upright and adjusting the same with relation thereto, comprising a split collar encircling the upright, a bolt, having an aperture to receive a scriber, carried by said collar, a nut for clamping the collar, bolt and scriber in the desired position with respect to the upright, a block, a hooked finger connecting the block and the collar, a feed screw having a ball and socket connection with the block, a nut on the feed screw and a link connecting said nut with the bolt.

5. A machinist's marking gage comprising a base, a stub pivotally mounted thereon, means for securing the stub in any desired position with relation to the base, a plurality of uprights detachably connected to the stub, the uprights being offset with respect to each other, scribers or measuring instruments carried thereby in the desired position with respect to the uprights, and means for guiding the base against an edge or a side of a laying out table or block comprising guide pieces fastened to the base and spaced apart from one another by spacing blocks, the guide pieces being capable of movement in a vertical direction with respect to the base.

6. A machinist's marking gage comprising a base, a stub pivotally mounted thereon, means for securing the stub in any desired position with relation to the base, an upright removably connected to the stub, a second upright removably connected to the stub and offset from the first-mentioned upright, a block slidable on the first upright having faces parallel to the faces of the upright, a screw to clamp the block on the upright, plates and screws clamping scribers or measuring instruments to the faces of the block, and means for securing scribers or measuring instruments to the second upright in the desired position and for adjusting them with relation thereto.

7. A machinist's marking gage comprising a base, a stub pivotally mounted thereon, means for securing the stub in any desired position with relation to the base, a plurality of uprights detachably connected to the stub and offset with respect to each other, one of said uprights having two sides disposed at a known angle to each other, a block on said upright having sides parallel to the sides of the upright, means for clamping scribers or measuring instruments to the block, and means for securing scribers or measuring instruments to the other uprights.

Signed at New York in the county of New York and State of New York this 31st day of October, A. D. 1919.

EDWARD WULZ.